April 22, 1958
U. LAUTIAINEN
2,831,375
SET REGULATOR FOR SAW BLADES
Filed June 3, 1954
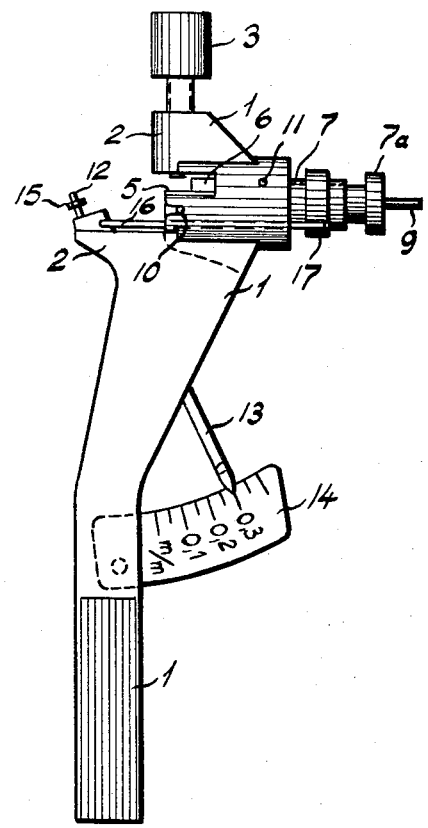
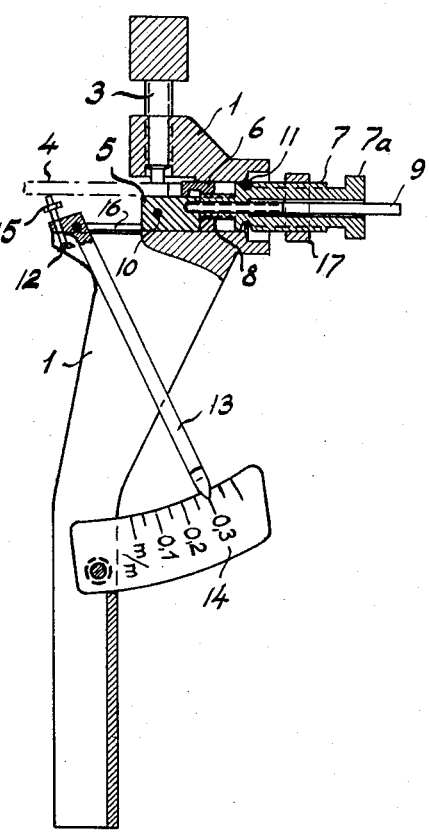
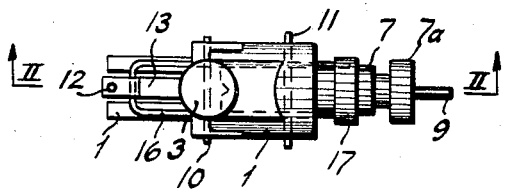
INVENTOR:
UUNO LAUTIAINEN
By Richards & Geier
ATTORNEYS

2,831,375
SET REGULATOR FOR SAW BLADES

Uuno Lautiainen, Helsinki, Finland

Application June 3, 1954, Serial No. 434,131

2 Claims. (Cl. 76—58)

The great importance of the setting of saw blades is generally known. In the known saw set devices there is however a common defect, in that the same device can not be successfully used for other than one single size of saw teeth.

An object of the present invention is the provision of a set regulator for saw blades, which is adjustable for the setting of different sizes of saw teeth, said regulator comprising jaws, one-half of which is equipped with a pressing screw for pressing the tooth to be set against a set plane on the other jaw, whose edge determines the bending point on the tooth, the regulator further comprising a limiting device for determining the depth position of the teeth between the jaws, the depth position of the set plane and the limiting device being simultaneously adjustable with the aid of an adjusting screw device with the object to make the adjusting of the setting depth possible e. g. in case of saw teeth of different sizes.

The accompanying drawing illustrates by way of example a device constructed according to the invention.

Fig. 1 is an elevation of the device,

Fig. 2 is a vertical section of same at II—II, Fig. 3 and

Fig. 3 is an end view of same.

The body of the device is a die casting 1, the lower end forming a handle and the upper end the jaws 2.

In the one half jaw there is a pressing screw 3 for performing the function of clamping the teeth and, by which the saw tooth is pressed against the set plane 5 on the other jaw. The limiting piece 6 determines the depth of the teeth in the device.

By way of operation the necessary bending of the saw tooth positioned on the member 5 and clamped by the screw 3 against the member 5 is accomplished by hand. When a tooth is being bent it will come into contact with the screw 12 which transmits the movement to the pointer 13. The manual bending of the tooth is continued until the pointer indicates the desired setting angle. In this way each tooth of the saw blade is set separately.

The position of the set plane 5 and the limiter 6 between the jaws is adjusted by a set screw 7. The screw 7 has at the point 8 left hand threads connecting with the threads on the rear end of the limiting piece 6. In a bore in the centre of the screw 7 there are right hand threads, connecting with the threads on a pin 9. The pin 9 is in the manner of a pin bolt fastened to the set plane 5, which in its transverse section is of segmental form. The transverse section of the limiter 6 is also of segmental form, thus completing the transverse sectional form of the set plane so, that a circular section is produced. These both parts are axially movable in a bore in the body proper. A rotation is prevented by a pin 10 arranged in a slit at the front edge of the set plane 5.

The adjusting screw 7 is freely rotatable, but the axial movement of same is prevented by the pins 11, which communicate with a guiding groove on the adjusting screw 7. By turning the adjusting screw e. g. clockwise, the setting plane 5 between the jaws moves in relation to the foresaid left- and righthanded thread-arrangement inward and the limiter outward, when the device becomes suitable for a smaller size of teeth. This simultaneous movement has the advantage, that the pressing screw 3 always presses against the center of the tooth.

In addition to the depth of the setting depth there is another important factor, the setting angle, which is determined with the aid of a pointer arrangement in the device. By setting a tooth the saw blade comes in to contact with a screw 12, which transmits the bending movement to a pointer 13. From a scale 14 the setting angle is readily readable. The nut 14 serves for locking of the screw 12 for the fundamental setting.

The pointer 13 is linked to a steel wire fork 16, whose branches are fastened to a nut on the outer threads of the screw 7. An adjustment of the screw 7 affects thus the position of the bearing point of the pointer 13 moving in proportion to the size of the tooth to be set.

The setting of a saw blade with a device according to the invention is carried out whereby one tooth at a time with the screw 3 pressed against the set plane and the handle is turned till the pointer 13 shows the desired reading.

The invention is not limited to the details of construction and arrangement herein shown and described, and many changes and modifications may be made therein within the subjoined claims.

Having now described my invention, what I claim is:

1. A set regulator for saw blades having a plurality of saw teeth comprising jaws, a pressing screw carried by one portion of said jaw, another jaw having a set plane of adjustable depth disposed therein, at least one edge carried by one said second-mentioned jaw for determining the bending point of one said tooth, a limiting device having an adjustable depth position and carried by said regulator for determining the depth position of one said tooth between at least two said jaws, and an adjusting screw arrangement for simultaneously adjusting the depth position of said set plane and said limiting device.

2. In a set regulator for saw blades in accordance to claim 1 wherein said regulator comprises a wire fork, a pointer carried by said wire fork for controlling the setting angle of said saw blade, and a contact screw coacting with said saw blade for transmitting the bending movement to said pointer, the swinging point of said pointer being movable simultaneously with the adjustment of said parts by variation of the size of said teeth and the depth of said setting.

References Cited in the file of this patent

UNITED STATES PATENTS

| 1,055,061 | Little | Mar. 4, 1913 |
| 1,230,166 | Hunger | June 19, 1917 |
| 1,447,112 | Wood | Feb. 27, 1923 |
| 1,519,450 | Hanson | Dec. 16, 1924 |
| 1,817,272 | Schroeder | Aug. 4, 1931 |

FOREIGN PATENTS

| 528,869 | France | Dec. 21, 1920 |